(12) United States Patent
Kim et al.

(10) Patent No.: US 12,435,188 B2
(45) Date of Patent: Oct. 7, 2025

(54) METHOD FOR PREPARING BIODEGRADABLE POLYMER MICROPARTICLES, AND BIODEGRADABLE POLYMER MICROPARTICLES PREPARED THEREBY

(71) Applicant: SAMYANG HOLDINGS CORPORATION, Seoul (KR)

(72) Inventors: Jin Su Kim, Yongin-si (KR); Wang Soo Shin, Daejeon (KR); Na Jeong Park, Suwon-si (KR)

(73) Assignee: SAMYANG HOLDINGS CORPORATION, Seoul (KR)

( * ) Notice: Subject to any disclaimer, the term of this patent is extended or adjusted under 35 U.S.C. 154(b) by 505 days.

(21) Appl. No.: 16/633,727

(22) PCT Filed: Jul. 25, 2018

(86) PCT No.: PCT/KR2018/008411
§ 371 (c)(1),
(2) Date: Jan. 24, 2020

(87) PCT Pub. No.: WO2019/022502
PCT Pub. Date: Jan. 31, 2019

(65) Prior Publication Data
US 2020/0207930 A1    Jul. 2, 2020

(30) Foreign Application Priority Data

Jul. 27, 2017    (KR) .................. 10-2017-0095425

(51) Int. Cl.
*C08J 3/12*       (2006.01)
*A61K 9/16*      (2006.01)
(Continued)

(52) U.S. Cl.
CPC .............. *C08J 3/12* (2013.01); *A61K 9/1647* (2013.01); *A61K 9/1652* (2013.01); *A61L 27/18* (2013.01);
(Continued)

(58) Field of Classification Search
CPC .......... A61L 27/18; A61L 27/20; A61L 27/26; A61L 2300/604; A61L 27/58; C08J 3/12;
(Continued)

(56) References Cited

FOREIGN PATENT DOCUMENTS

| CN | 1608725 A |  | 4/2006 |  |
|---|---|---|---|---|
| CN | 102188384 A | * | 9/2011 | ............... A61K 9/14 |

(Continued)

OTHER PUBLICATIONS

English machine translation of CN-102188384-A made Sep. 30, 2021. (Year: 2021).*
Ma et al., "Preparation of uniform poly(lactide) microspheres by employing the Shirasu Porous Glass (SPG) emulsification technique", 1999, Colloids and Surfaces A: Physiochemical and Engineering Aspects, vol. 153, pp. 383-394. (Year: 1999).*
(Continued)

*Primary Examiner* — Michael B. Pallay
(74) *Attorney, Agent, or Firm* — Birch, Stewart, Kolasch & Birch, LLP

(57) ABSTRACT

Provided are: a method for preparing biodegradable polymer microparticles and, particularly, porous microparticles of a biodegradable polymer; and biodegradable polymer microparticles prepared thereby, particularly, porous microparticles of a biodegradable polymer.

11 Claims, 4 Drawing Sheets

(51) Int. Cl.
*A61L 27/18* (2006.01)
*A61L 27/20* (2006.01)
*A61L 27/26* (2006.01)
*A61L 27/58* (2006.01)

(52) U.S. Cl.
CPC .............. *A61L 27/20* (2013.01); *A61L 27/26* (2013.01); *A61L 27/58* (2013.01); *A61L 2300/604* (2013.01); *C08J 2367/04* (2013.01)

(58) Field of Classification Search
CPC ... C08J 2300/16; A61K 9/1647; A61K 9/1652
See application file for complete search history.

(56) References Cited

FOREIGN PATENT DOCUMENTS

| | | |
|---|---|---|
| CN | 102861345 A | 1/2013 |
| CN | 105832704 A | 8/2016 |
| JP | 2007-145826 A | 6/2007 |
| JP | 2009-144012 A | 7/2009 |
| JP | 2010-531303 A | 9/2010 |
| JP | 2016-204491 A | 12/2016 |
| KR | 10-2011-0075618 A | 7/2011 |
| KR | 10-1302902 B1 | 9/2013 |
| KR | 10-1369952 B1 | 3/2014 |
| KR | 10-1685312 B1 | 12/2016 |
| KR | 10-1942449 B1 | 1/2019 |
| WO | WO 2004/019882 A1 | 3/2004 |
| WO | WO 2009/001697 A2 | 12/2008 |
| WO | WO 2012/108140 A1 | 8/2012 |
| WO | WO 2017/085428 A1 | 4/2017 |

OTHER PUBLICATIONS

Vladisavljevic, "Structured microparticles with tailored properties produced by membrane emulsification", 2015, Advances in Colloid and Interface Science, vol. 225, pp. 53-87. (Year: 2015).*
Imbrogno et al., "Preparation of uniform poly-caprolactone Microparticles by membrane emulsification/solvent diffusion process", 2014, Journal of Membrane Science, vol. 467, pp. 262-268. (Year: 2014).*
Kim et al., "Technology Trend for the Preparation of Polymeric Particles by SPG Technique," Elastomers and Composites, vol. 44, No. 3, Sep. 2009, pp. 222-231, with English abstract.
Liu et al., "Preparation of uniform-sized PLA microcapsules by combining Shirasu Porous Glass membrane emulsification technique and multiple emulsion-solvent evaporation method," Journal of Controlled Release, vol. 103, 2005, pp. 31-43.
Ma et al., "Preparation of uniform poly(lactide) microspheres by employing the Shirasu Porous Glass (SPG) emulsification technique," Colloids and Surfaces A: Physiochemical and Engineering Aspects, vol. 153, 1999, pp. 383-394.
Vladisavljević, "Structured microparticles with tailored properties produced by membrane emulsification," Advances in Colloid and Interface Science, vol. 225, 2015 (available online Aug. 20, 2015), pp. 53-87.
Extended European Search Report for European Applicati No. 18839259.1. dated Mar. 19, 2021.
Wang et al., "Biocompatible Microcapsule of Carboxymethyl Cellulose/Chitosan as Drug Carrier," Advanced Materials Research, vol. 1118, Jul. 1, 2015, pp. 227-236, XP055782992.

* cited by examiner

METHOD FOR PREPARING BIODEGRADABLE POLYMER MICROPARTICLES, AND BIODEGRADABLE POLYMER MICROPARTICLES PREPARED THEREBY

TECHNICAL FIELD

The present invention relates to preparation of microparticles of biodegradable polymer, and more specifically, a method for preparing microparticles of biodegradable polymer and microparticles of biodegradable polymer, particularly porous microparticles of biodegradable polymer, prepared therefrom.

BACKGROUND ART

Microparticle of biodegradable polymer has a property of degradation in a living body, and by utilizing the property, it is widely used as a body implant such as filler for plastic surgery or a carrier for drug delivery in the field of DDS (Drug Delivery System). Recently, biodegradable polymer filler—which is the fourth generation filler—has received attention in the market of filler for plastic surgery. Biodegradable polymers such as polylactic acid or polycaprolactone are prepared in the form of microparticles and used as a tissue repair material to repair the wrinkles with collagen generated by degradation of the biodegradable polymer.

Microparticles for use as a raw material of biodegradable polymer filler preferably have a diameter of at least 20 μm. This is to avoid phagocytosis of macrophage present in living body. If the diameter is less than 20 μm, the microparticles may be taken by macrophage and degraded before generating collagen. If the diameter is 20 μm or greater, the microparticles may cause in vivo foreign body reaction and promote collagen generation, while avoiding phagocytosis of macrophage. However, if the diameter is greater than 50 μm, the microparticles cannot pass through the injection needle and clogging of needle may be caused. In addition, if the microparticles are amorphous, they can be agglomerated and clogging of needle may be caused, too. Accordingly, it is preferable for microparticles used as a raw material of filler for plastic surgery to have spherical shape and a size of 20 to 50 μm. The biodegradable polymer fillers currently available from the market are all porous and mixed with a carrier for maintaining dispersion of microparticles, and marketed in the form of vial or prefilled syringe. Different from hyaluronic fillers, biodegradable polymer fillers have the disadvantage of volume reduction due to the absorption of carrier in a short time immediately after the surgical procedure, leaving only the volume of biodegradable polymer injected together.

Korean Patent No. 1142234 relates to an easily injectable filler system of porous microparticles. However, since the microparticles prepared thereby are characterized in having a particle size ranging from 100 to 5,000 μm, they cannot be used as filler for facial application, and the surface of the microparticle is not smooth. Korean Patent No. 1685312 discloses a preparation method of injection agent for use as filler containing biodegradable polymer for tissue restoration in porous microparticle state, and a preparation device thereof. However, the size of the particles prepared thereby is not uniform, and the particle shape is amorphous, not spherical.

In methods of preparing microparticles of biodegradable polymer, it is general to prepare W/O/W and O/W/O emulsions and use physical and chemical properties thereof, and emulsifying devices such as homogenizer or microfluidic have been continuously developed. However, in case of using homogenizer, the production process is simple, but the particle size distribution becomes broad, and if the microparticles are porous, the pore size is not uniform and pores greater than 10 μm are generated in a large amount. In case of using microfluidic, the particle size distribution is narrow, but mass production is difficult and thus it is hard to apply for industrial scale.

A method of preparing microparticles by using SPG membrane (Shirasu Porous Glass membrane) developed in Japan has been known. By this method, microparticles having uniform particle size can be prepared. In addition, this method can prepare microparticles in mass scale and so it has been known as industrially applicable. Korean Patent No. 1302902 prepares metal nanoparticles by using SPG membrane, and Korean Patent No. 1369952 prepares toner particles by using SPG membrane. However, these patents use metal, carbon black, monomer such as wax, etc.—which are not a biodegradable polymer—and thus the particles prepared thereby cannot be used as a tissue repair material or a carrier for drug delivery.

Therefore, it is required to establish a technology for preparing microparticle of biodegradable polymer material which can be used as a tissue repair material or a carrier for drug delivery and can be produced in industrial mass scale.

Problems to be Solved

The first purpose of the present invention is to provide a method for preparing microparticles of biodegradable polymer material which can be used as a tissue repair material or a carrier for drug delivery and can be produced in industrial mass scale.

The second purpose of the present invention is to provide biodegradable polymer microparticle prepared by the above method for preparing microparticles.

The third purpose of the present invention is to provide a method for preparing polymer filler by using the above microparticles.

The fourth purpose of the present invention is to provide polymer filler comprising the above microparticles.

Technical Means

The first aspect of the present invention relates to a method for preparing biodegradable polymer microparticles, the method comprising the steps of:
1) dissolving a biodegradable polymer in an organic solvent to form a dispersed phase;
2) applying pressure to the dispersed phase formed in step 1) to allow the dispersed phase to pass through the pore of SPG membrane (Shirasu Porous Glass membrane), and thereby to form an emulsion in a continuous phase comprising a surfactant; and
3) removing the organic solvent from the emulsion formed in step 2) to form microparticles.

The second aspect of the present invention relates to biodegradable polymer microparticle prepared by the above method for preparing microparticles.

The third aspect of the present invention relates to a method for preparing polymer filler, the method comprising the steps of:
preparing biodegradable polymer microparticles by the above method; and
mixing the biodegradable polymer microparticles with one or more biocompatible carriers.

The fourth aspect of the present invention relates to polymer filler comprising:
- the biodegradable polymer microparticles; and
- one or more biocompatible carriers.

Effect of the Invention

According to the present invention, it is possible to provide a technology for preparing microparticle of biodegradable polymer material which can be used as a tissue repair material or a carrier for drug delivery and can be produced in industrial mass scale. In particular, it is possible to impart porosity to conventional biodegradable polymer microparticles, and stably produce microparticles with small particle size and narrow particle size distribution—i.e., uniform size.

DETAILED DESCRIPTION

Figure 1:
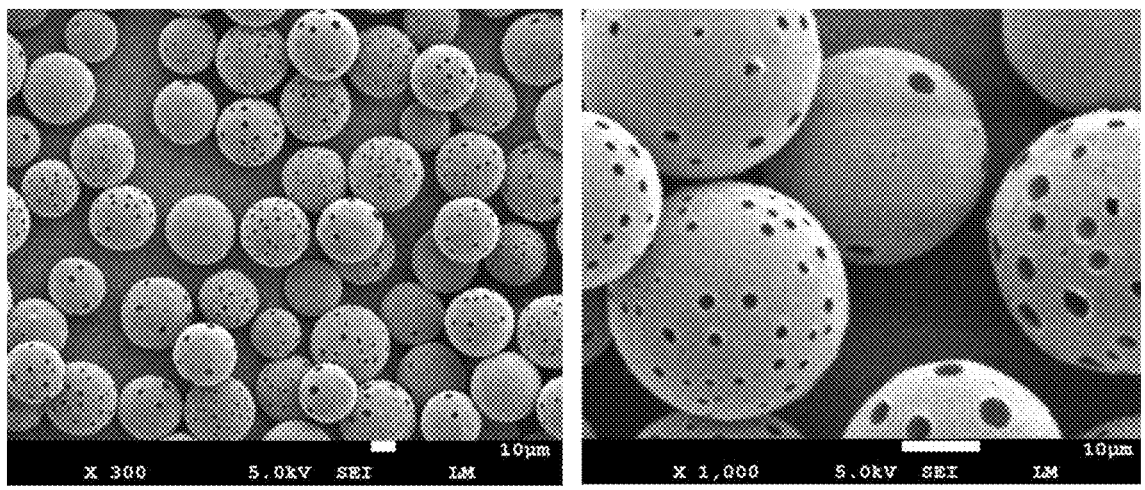
FIG. 1 shows scanning electron microscope (SEM) photographs of the biodegradable polymer porous microparticles prepared according to Example 1 of the present invention.

The present invention is explained in detail below.

In an embodiment of the present invention, the biodegradable polymer microparticles can satisfy the following features i) and ii):
- i) spherical shape,
- ii) particle diameter of 10 to 200 µm, Preferably, the particle size of the polymer microparticle is smaller than the diameter of the injection needle to be used so that it can be injected, and preferably the shape of the particle is substantially in spherical form so as not to cause pain to the patient and not to be felt by touch. In an embodiment, the particle size (particle diameter) of the biodegradable polymer microparticle can be typically 200 µm or less, and it preferably has a diameter of 10 µm or greater in order not to be taken by macrophage in living tissues. In a preferable embodiment, the microparticle can have a diameter of 10 to less than 100 µm, more preferably 10 to 80 µm, still more preferably 10 to 50 µm, and most preferably 20 to 40 µm.

In an embodiment of the present invention, the dispersed phase can further comprise porogen so as to form porous microparticles. In a preferable embodiment, the concentration of porogen dissolved in an organic solvent can be in a range of from 1 to 10% by weight. If the concentration of porogen is lower than 1% by weight, pores may not be formed sufficiently. If the concentration of porogen is higher than 10% by weight, due to the excessive pore formation, the physical strength of the porous microparticle itself becomes weak and cells may permeate into the pores.

In a preferable embodiment, the porous microparticle has the features described in Korean Patent Application No. 2016-0169309. Korean Patent Application No. 2016-0169309 is herein incorporated by reference in its entirety. For instance, the porous microparticles can satisfy the following features i) to iv):
- i) spherical shape,
- ii) particle diameter of 10 to 200 µm,
- iii) pore diameter of 0.1 to 20 µm, and
- iv) porosity ratio of 10 to 50%.

In an embodiment, as the standard of particle size distribution, the porous microparticle of biodegradable polymer has $d_{10}$ of greater than 20 µm and $d_{90}$ of less than 100 µm, preferably $d_{10}$ of greater than 20 µm and $d_{90}$ of less than 60 µm, and still more preferably $d_{10}$ of greater than 25 µm and $d_{90}$ of less than 40 µm.

Also, in an embodiment, the porous microparticle of biodegradable polymer should have a span value, which shows uniform distribution of particles, of less than 1, preferably less than 0.8, and more preferably less than 0.6. The span value becomes greater as the particle size distribution becomes broad, and it becomes close to 0 as the particle size distribution becomes narrow. The span value is calculated by the following equation:

$$\text{span} = \frac{D_{90} - D_{10}}{D_{50}}$$

[Definitions of $D_{10}$, $D_{50}$ and $D_{90}$: Size values corresponding to 10%, 50% and 90%, respectively, of the maximum value in accumulated distribution of particles, represented as the particle sizes corresponding to 1/10, 5/10 and 9/10, respectively, of the particle size distribution curve showing the relatively accumulated amounts of particles according to the size, when it is measured, plotted and divided into 10 fractions.]

The porous microparticle according to an embodiment of the present invention can have a larger volume per the same mass according to the porosity ratio. In an embodiment, the porosity ratio of the porous microparticle of biodegradable polymer can be 5 to 50%, preferably 10 to 50%, and more preferably 10 to 30%.

In the present invention, the "porosity ratio" is obtained according to the following equation:

Porosity ratio=(Volume of porous polymer microparticle−Volume of non-porous polymer microparticle)/Volume of porous polymer microparticle× 100

The pore size (diameter) of the porous microparticle of biodegradable polymer according to the present invention can be 0.1 µm to 20 µm, and preferably 0.1 to 10 µm, and more preferably 1 to 10 µm.

Figure 5:
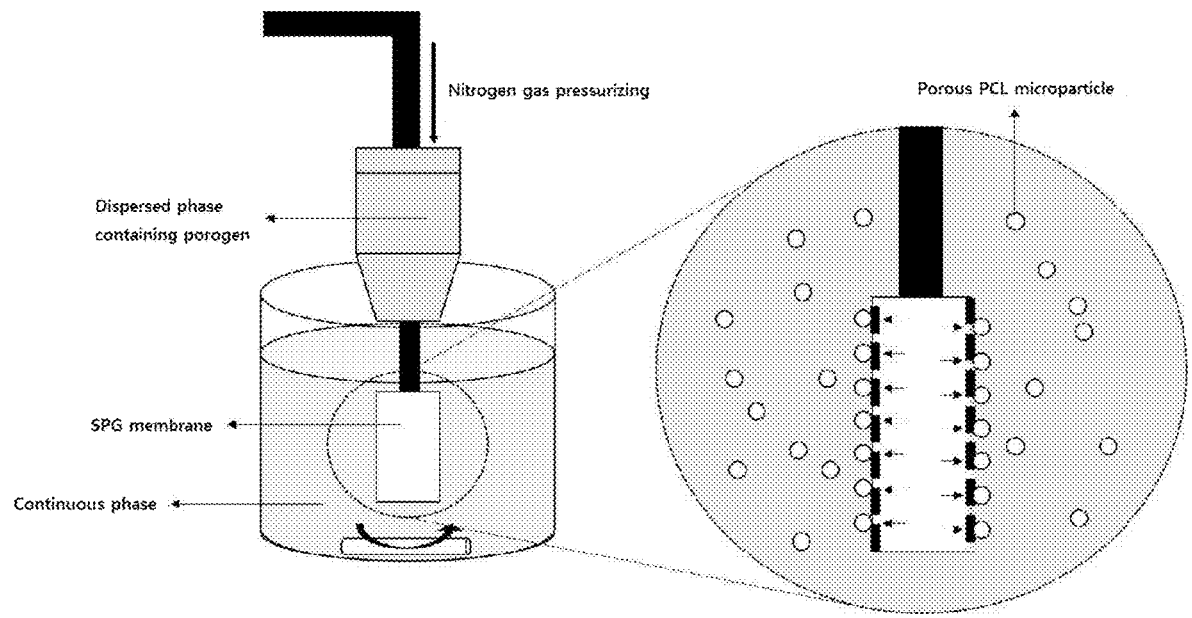
FIG. 5 is a schematic drawing of the device for preparing porous microparticles by using SPG membrane according to Example 1 of the present invention.

An embodiment of the present invention is characterized in preparing microparticles, particularly porous microparticles, of biodegradable polymer by applying SPG membrane emulsification method. A device for preparing porous microparticles by using SPG membrane according to Example 1 of the present invention is schematically shown in FIG. 5, but the scope of the present invention is not limited thereby.

In an embodiment of the present invention, the concentration of biodegradable polymer dissolved in an organic solvent is preferably in a range of from 5 to 20% by weight, particularly from 10 to 20% by weight, more particularly from 10 to 15% by weight. If the concentration of biodegradable polymer is lower than 5% by weight, the concentration of dispersed phase becomes low and the viscosity decreases, and it may be difficult to generate the emulsion with uniform size when passing through SPG membrane. If the concentration of biodegradable polymer is higher than 20% by weight, the concentration of dispersed phase becomes high and the viscosity increases, and not uniformly-sized emulsion but thread-like polymer may be formed when passing through SPG membrane.

Figure 6:
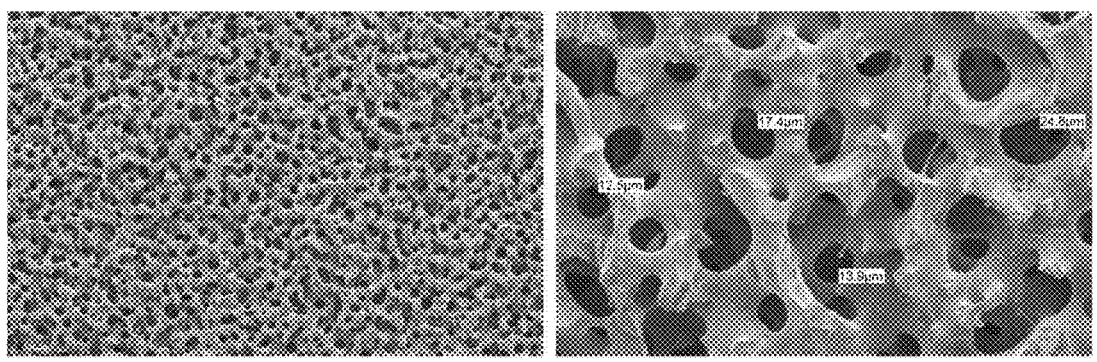
FIG. 6 shows scanning electron microscope (SEM) photographs of the SPG membrane used in Example 1 of the present invention.

In an embodiment of the present invention, SPG membrane can have pores ranging from 10 to 30 μm, particularly from 10 to 20 μm, and more particularly from 15 to 20 μm. If the pore size of SPG membrane is smaller than 10 μm, the average size of the formed porous microparticles is smaller than 20 μm and thus they can be taken by macrophage. If the pore size of SPG membrane is larger than 30 μm, the average size of the formed porous microparticles is larger than 50 μm and thus clogging of injection needle may be caused. FIG. 6 shows scanning electron microscope (SEM) photographs of the SPG membrane used in the example of the present invention, but the scope of the present invention is not limited thereby.

In an embodiment of the present invention, the pressure applied to the dispersed phase can be in a range of from 0.1 to 10 kPa, particularly from 1 to 10 kPa, and more particularly from 2 to 7 kPa. If the pressure is lower than 0.1 kPa, the dispersed phase cannot pass through SPG membrane, and thus the emulsion may not be formed. If the pressure is higher than 10 kPa, the dispersed phase passes through SPG membrane too fast, and thus not uniformly-sized emulsion but thread-like polymer may be formed.

In an embodiment of the present invention, the surfactant can have a concentration in a range of from 0.5 to 5% by weight, particularly from 0.5 to 3% by weight, and more particularly from 1 to 3% by weight. If the surfactant concentration is lower than 0.5% by weight, porous microparticles may be generated with non-uniform particle size. If the surfactant concentration is higher than 5% by weight, porous microparticles may be made with non-uniform pore size. In an embodiment, the surfactant can be selected from polyvinyl alcohol, sodium dodecyl sulfate, polysorbate, polyethylene glycol and combinations thereof. Preferably, polyvinyl alcohol can be used.

In an embodiment of the present invention, the continuous phase can be agitated at a speed in a range of from 100 to 500 rpm, particularly from 100 to 300 rpm, and more particularly from 100 to 250 rpm. If the agitation speed is lower than 100 rpm, the emulsion is dewy on SPG membrane and the dews get bigger thereon without falling, and thus porous microparticles may be formed with an average particle size of greater than 50 μm. If the agitation speed is higher than 500 rpm, the emulsion dews on SPG membrane fall too fast, and thus porous microparticles may be formed with an average particle size of less than 20 μm.

In a preferable embodiment, it is possible to use the combination of two or more of, particularly all of, the above specific ranges of biodegradable polymer concentration, pore size of SPG membrane, pressure applied to the dispersed phase and surfactant concentration in continuous phase, and in addition thereto the agitation speed of continuous phase.

In an embodiment of the present invention, the biodegradable polymer can be one or more selected from the group consisting of poly(lactic acid), poly(glycolic acid), poly(dioxanone), poly(caprolactone), poly(lactic acid-co-glycolic acid), poly(dioxanone-co-caprolactone), poly(lactic acid-co-caprolactone), derivatives thereof and copolymers thereof. Preferably, the biodegradable polymer is poly(lactic acid) or poly(caprolactone), and more preferably poly(caprolactone).

In an embodiment of the present invention, the biodegradable polymer can have a number average molecular weight (Mn) in a range of from 10,000 to 1,000,000 g/mol. More preferably, it can be in a range of from 10,000 to 100,000 g/mol.

According to an embodiment of the present invention, the amount of the porous microparticle of biodegradable polymer contained in the polymer filler can be typically 10 to 50% by weight, and more concretely 10 to 30% by weight, based on 100% by weight of the polymer filler, and it can be adjusted according to the desired volume effect of the desired injection part.

The polymer filler according to an embodiment of the present invention can further comprise one or more biocompatible carriers. Such a carrier is absorbed in body typically within 1 day to 6 months after the injection.

In an embodiment, a carrier selected from carboxymethyl cellulose, hyaluronic acid, dextran, collagen and combinations thereof can be used as the biocompatible carrier.

The amount of the biocompatible carrier contained in the polymer filler of the present invention can be typically 50 to 90% by weight, and more concretely 70 to 90% by weight, based on 100% by weight of the polymer filler.

As well as the ingredients explained above, additive ingredients—for example, a lubricant such as glycerin, phosphate buffer or the like conventionally comprised in an injection formulation—can be further comprised in the biocompatible carrier.

The polymer filler according to an embodiment of the present invention can be an injection formulation preferably. An injection formulation of the polymer filler according to an embodiment of the present invention can be provided as being contained in a sterilized injection syringe or a sterilized vial, and it has high use convenience since no pretreatment is needed, it is safe since 100% thereof is biodegraded over a predetermined time after the injection leaving no foreign substance in living tissues, and it does not cause allergic reaction since it contains no substances derived from animal at all.

In addition, as compared with the existing polymer product (for example, polymer content of 30%), the polymer filler according to an embodiment of the present invention can provide a greater volume effect with the same amount of polymer, and thus the volume effect can be maintained even if the carrier is absorbed. Therefore, the polymer filler according to an embodiment of the present invention can be used preferably for wrinkle improvement, facial plastic procedure or body plastic procedure.

The present invention is explained in more detail by the following examples. However, the following examples are intended only to illustrate the present invention, and should not be interpreted as limiting the scope of the present invention in any manner.

EXAMPLE

Example 1

As a dispersed phase, 5 g of polycarprolactone (PCL) with a number average molecular weight of 45,000 g/mol and 1 g of tetradecane were dissolved in 100 g of methylene chloride. SPG membrane with 15 μm pore (FIG. 6) was combined to a SPG membrane emulsification device. The prepared dispersed phase was injected into a continuous phase—which was 2 wt % aqueous solution of polyvinyl alcohol—through SPG membrane under nitrogen pressure of 2 kPa. At that time, the aqueous solution of polyvinyl alcohol was agitated at 250 rpm speed, and after completing the injection, the mixture was continuously agitated for 24 hours (FIG. 5). The prepared porous PCL microparticles were agitated in 500 ml of distilled water for 2 hours to wash out the remaining polyvinyl alcohol, recovered by using a centrifuge, and washed with 500 ml of ethyl alcohol for 2 hours to to remove the remaining tetradecane and methylene chloride. After the washing, the porous PCL microparticles were dried in a vacuum dryer for 48 hours to remove the remaining ethyl alcohol.

Example 2

As a dispersed phase, 1 g of polycarprolactone (PCL) with a number average molecular weight of 50,000 g/mol and 0.2 g of tetradecane were dissolved in 20 g of methylene chloride. SPG membrane with 15 μm pore (FIG. 6) was combined to a SPG membrane emulsification device. The prepared dispersed phase was injected into a continuous phase—which was 2 wt % aqueous solution of polyvinyl alcohol—through SPG membrane under nitrogen pressure of 2 kPa. At that time, the aqueous solution of polyvinyl alcohol was agitated at 250 rpm speed, and after completing the injection, the mixture was continuously agitated for 24 hours (FIG. 5). The prepared porous PCL microparticles (porosity ratio: 10%) were agitated in 500 ml of distilled water for 2 hours to wash out the remaining polyvinyl alcohol, recovered by using a centrifuge, and washed with 500 ml of ethyl alcohol for 2 hours to to remove the remaining tetradecane and methylene chloride. After the washing, the porous PCL microparticles were dried in a vacuum dryer for 48 hours to remove the remaining ethyl alcohol.

Example 3

As a dispersed phase, 1 g of polycarprolactone (PCL) with a number average molecular weight of 50,000 g/mol and 0.3 g of tetradecane were dissolved in 20 g of methylene chloride. SPG membrane with 15 μm pore (FIG. 6) was combined to a SPG membrane emulsification device. The prepared dispersed phase was injected into a continuous phase—which was 2 wt % aqueous solution of polyvinyl alcohol—through SPG membrane under nitrogen pressure of 2 kPa. At that time, the aqueous solution of polyvinyl alcohol was agitated at 250 rpm speed, and after completing the injection, the mixture was continuously agitated for 24 hours (FIG. 5). The prepared porous PCL microparticles (porosity ratio: 20%) were agitated in 500 ml of distilled water for 2 hours to wash out the remaining polyvinyl alcohol, recovered by using a centrifuge, and washed with 500 ml of ethyl alcohol for 2 hours to to remove the remaining tetradecane and methylene chloride. After the washing, the porous PCL microparticles were dried in a vacuum dryer for 48 hours to remove the remaining ethyl alcohol.

Comparative Example 1

Excepting that the dispersed phase was rapidly fed into 2 wt % aqueous solution of polyvinyl alcohol by using a homogenizer with agitation at 4000 rpm speed and after the agitation for 1 minute the mixture was agitated at 250 rpm speed for 24 hours, porous PCL microparticles were prepared according to substantially the same procedure as Example 1.

Experimental Example 1

Figure 2:
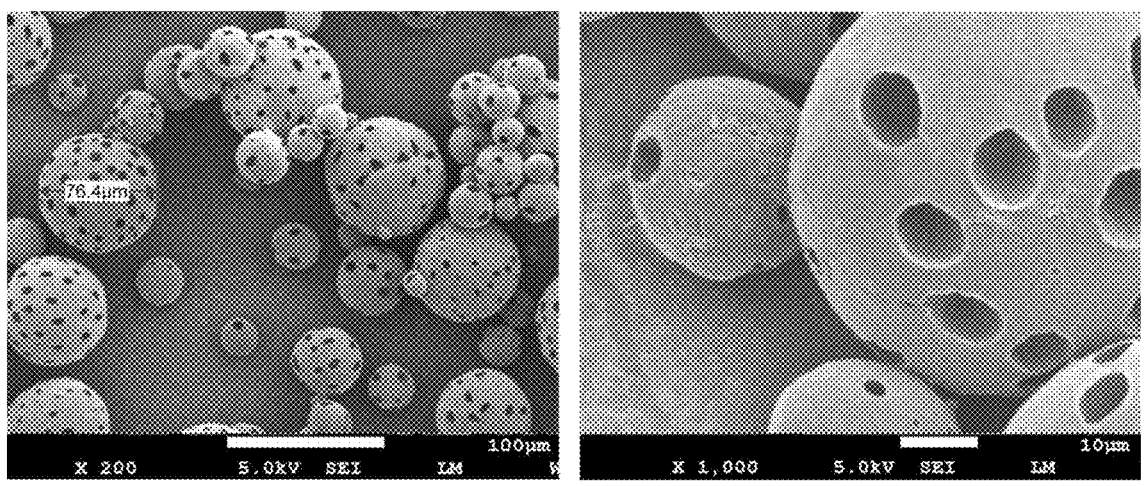
FIG. 2 shows scanning electron microscope (SEM) photographs of the biodegradable polymer porous microparticles prepared according to Comparative Example 1 of the present invention.

The porous PCL microparticles obtained in Example 1 and the porous PCL microparticles obtained in Comparative Example 1 were observed with scanning electron microscope (SEM). The results are shown in FIG. 1 and FIG. 2, respectively. As can be confirmed from the figures, the present invention using SPG membrane emulsification method could provide porous microparticles with smaller size and narrower particle size distribution—i.e., uniform particle size—as compared with the case using a homogenizer.

Experimental Example 2

Figure 3:
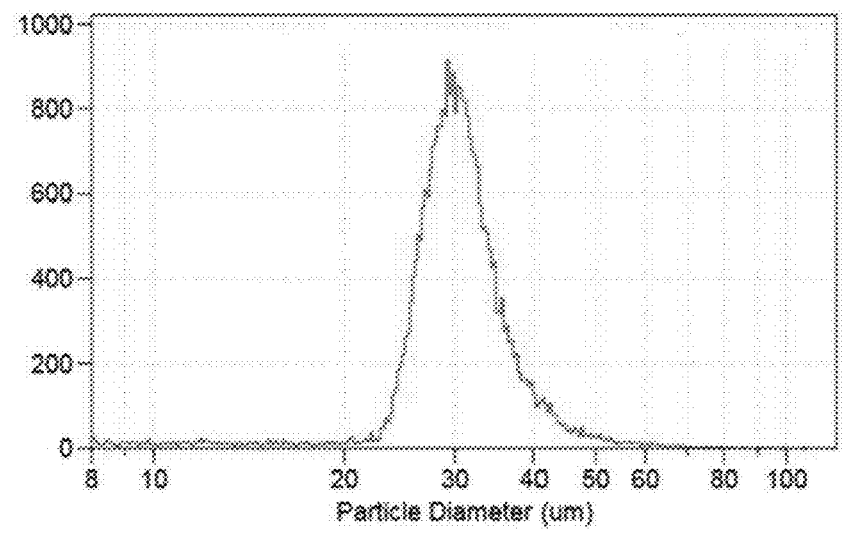
FIG. 3 shows the sizes and particle size distribution of the biodegradable polymer porous microparticles prepared according to Example 1 of the present invention.
Figure 4:
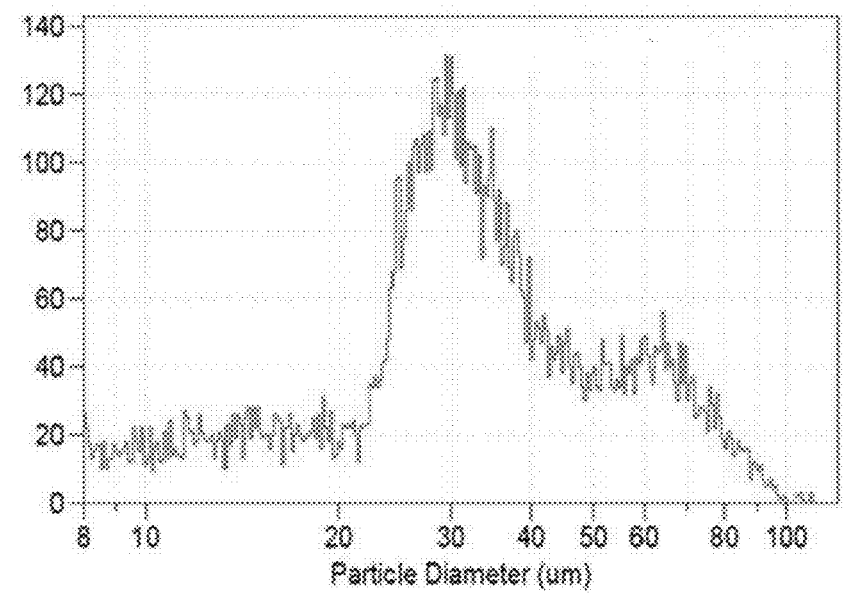
FIG. 4 shows the sizes and particle size distribution of the biodegradable polymer porous microparticles prepared according to Comparative Example 1 of the present invention.

The particle size distributions of the porous PCL microparticles obtained in Example 1 and the porous PCL microparticles obtained in Comparative Example 1 were measured by using a particle size analyzer. The results are shown in FIG. 3 and FIG. 4, respectively. As can be known from the figures, the porous PCL microparticles obtained in Example 1 showed remarkably narrower particle size distribution—i.e., uniform particle size—as compared with the porous PCL microparticles obtained in Comparative Example 1. The results of particle size distribution analysis are shown in the following Table 1.

TABLE 1

| | $D_{10}$ | $D_{50}$ | $D_{90}$ | C.V.[1] | span |
|---|---|---|---|---|---|
| Example 1 | 25.35 μm | 30.17 μm | 37.57 μm | 22.2% | 0.41 |
| Comparative Example 1 | 14.17 μm | 31.37 μm | 63.81 μm | 50.9% | 1.58 |

[1]C.V. (coefficient of variation): The value of dividing standard deviation by average, and the standard for measuring the degree of relative dispersion. As the calculated value is closer to 0, it means that the particles are populated on the average and the degree of dispersion is small.

Examples 4 to 6

The polymer filler formulations of Examples 4 to 6 were prepared by mixing the porous microparticles of biodegradable polymer prepared in Examples 1 to 3, respectively, with a carrier prepared from 3% by weight of carboxymethyl cellulose, 27% by weight of glycerin and 70% by weight of phosphate buffer. At that time, the mixing ratio was, based on 100% by weight of the mixture, 30% by weight of the porous microparticles and 70% by weight of the carrier.

Comparative Examples 2 and 3

Commercially available facial filler (Ellanse®) using PCL as the raw material was purchased and used as Comparative Example 2. Commercially available facial filler (Sculptra®) using polylactic acid (PLA) as the raw material was purchased and used as Comparative Example 3.

Experimental Example 3

Figure 7:
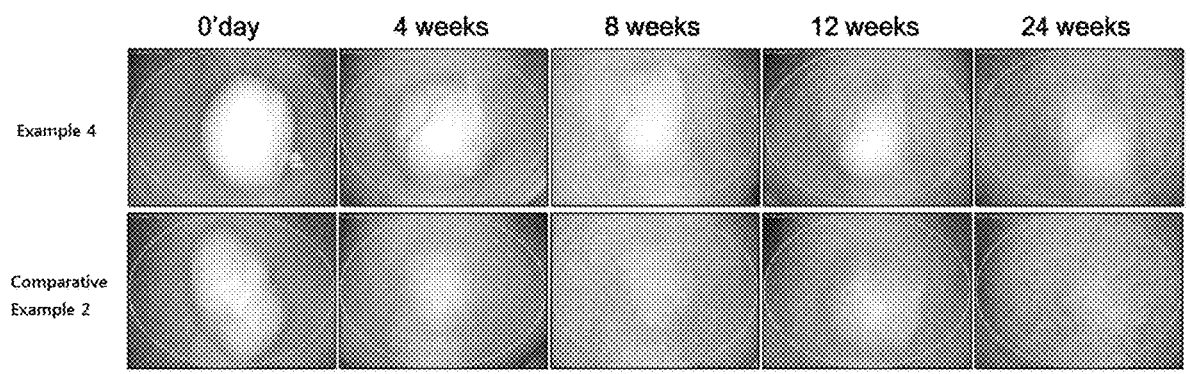
FIG. 7 shows DSLR (Digital Single Lens Reflex) camera photographs of the injection parts of mice after injecting the polymer filler prepared in Example 4 and the filler of Comparative Example 2 of the present invention.
Figure 8:
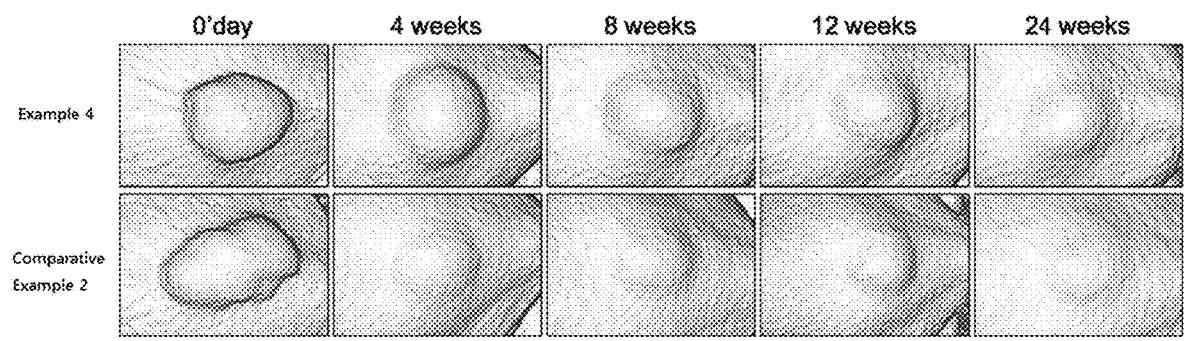
FIG. 8 shows three-dimensional photographs of the injection parts of mice after injecting the polymer filler prepared in Example 4 and the filler of Comparative Example 2 of the present invention.

Each of the formulations of Examples 4 to 6 and Comparative Examples 2 and 3 was filled within a syringe and 200 µl thereof was injected into the back of a hairless mouse. The sizes of the injection parts were measured, and the size changes were checked continuously with period of a certain time. The results are shown in the following Table 2. In addition, the polymer filler of Example 4 and the polymer filler of Comparative Example 2 were injected into the mice. From the injection parts for 2 weeks, DSLR (Digital Single Lens Reflex) camera photographs were taken and are shown in FIG. 7, and three-dimensional photographs were taken and are shown in FIG. 8.

As shown in the following Table 2, as for the filler formulation comprising the porous microparticles of biodegradable polymer according to the present invention, it can be confirmed that the initial volume reduction after the procedure was improved remarkably.

TABLE 2

|  | Example 4 | Example 5 | Example 6 | Comp. Example 1 | Comp. Example 2 |
| --- | --- | --- | --- | --- | --- |
| Volume immediately after the procedure | 100% | 100% | 100% | 100% | 100% |
| Volume after 3 months | 100% | 100% | 100% | 80% | 60% |
| Volume after 6 months | 80% | 80% | 85% | 40% | 20% |

The invention claimed is:

1. A method for preparing porous biodegradable polymer microparticles, the method comprising the steps of:
   1) dissolving a biodegradable polymer and a porogen in an organic solvent to form a dispersed phase;
   2) applying pressure to the dispersed phase formed in step 1) to allow the dispersed phase to pass through the pore of SPG membrane (Shirasu Porous Glass membrane), and thereby to form an emulsion in a continuous phase comprising a surfactant; and
   3) removing the organic solvent from the emulsion formed in step 2) to form porous microparticles,
   wherein the biodegradable polymer is one or more selected from the group consisting of poly(glycolic acid), poly(caprolactone), derivatives thereof and copolymers thereof; and
   the porous biodegradable polymer microparticles satisfy the following features i) to iii):
   i) spherical shape;
   ii) particle diameter of 20 to 40 µm;
   iii) porosity ratio of 5 to 50%,
   wherein the biodegradable polymer has a number average molecular weight (Mn) in a range of 10,000 to 100,000 g/mol,
   wherein the SPG membrane has pores ranging from 10 to 30 µm, and
   wherein the porous biodegradable polymer microparticles are suitable for preparing polymer filler for tissue repair.

2. The method for preparing porous biodegradable polymer microparticles according to claim 1, wherein the porous microparticles satisfy the following feature iv):
   iv) pore diameter of 0.1 to 10 µm.

3. The method for preparing porous biodegradable polymer microparticles according to claim 1, wherein the porous microparticles have $d_{10}$ of greater than 20 µm and $d_{90}$ of less than 100 µm.

4. The method for preparing porous biodegradable polymer microparticles according to claim 1, wherein the porous microparticles have a span value of less than 1.

5. The method for preparing porous biodegradable polymer microparticles according to claim 1, wherein the pressure applied to the dispersed phase is in a range of from 0.1 to 10 kPa.

6. The method for preparing porous biodegradable polymer microparticles according to claim 1, wherein the surfactant has a concentration in a range of from 0.5 to 5% by weight.

7. The method for preparing porous biodegradable polymer microparticles according to claim 1, wherein the concentration of biodegradable polymer dissolved in the dispersed phase is in a range of from 5 to 20% by weight.

8. The method for preparing porous biodegradable polymer microparticles according to claim 1, wherein the continuous phase is agitated at a speed in a range of from 100 to 500 rpm.

9. A method for preparing polymer filler, the method comprising the steps of:
   preparing porous biodegradable polymer microparticles by the method according to claim 1; and
   mixing the porous biodegradable polymer microparticles with one or more biocompatible carriers.

10. A porous biodegradable polymer microparticle prepared by the method according to claim 1.

11. Polymer filler comprising:
    the porous biodegradable polymer microparticle according to claim 10; and
    one or more biocompatible carriers.

* * * * *